(12) United States Patent
Chen et al.

(10) Patent No.: US 7,609,508 B2
(45) Date of Patent: Oct. 27, 2009

(54) COMPUTER ENCLOSURE UTILIZING A MOUNTING APPARATUS

(75) Inventors: Yun-Lung Chen, Taipei Hsien (TW); Yu-Ming Xiao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 294 days.

(21) Appl. No.: 11/681,195

(22) Filed: Mar. 2, 2007

(65) Prior Publication Data

US 2008/0116091 A1    May 22, 2008

(30) Foreign Application Priority Data

Nov. 22, 2006    (CN) .......................... 2006 2 0015934

(51) Int. Cl.
*G06F 1/16* (2006.01)
*A47B 81/00* (2006.01)
*A47F 7/00* (2006.01)
*H05K 7/16* (2006.01)

(52) U.S. Cl. ............... 361/679.33; 361/726; 312/223.2; 211/26

(58) Field of Classification Search ......... 361/683–685, 361/679.01–679.45, 724–727; 312/223.1–223.2; 211/26; 174/50
See application file for complete search history.

(56) References Cited

U.S. PATENT DOCUMENTS

| | | | |
|---|---|---|---|
| 6,377,450 B1 * | 4/2002 | Gan | 361/685 |
| 6,614,654 B2 | 9/2003 | Liu et al. | |
| 2005/0062375 A1 * | 3/2005 | Chen et al. | 312/223.2 |
| 2005/0103729 A1 * | 5/2005 | Chen et al. | 211/26 |
| 2005/0141189 A1 * | 6/2005 | Chen et al. | 361/685 |
| 2005/0190535 A1 * | 9/2005 | Peng et al. | 361/685 |
| 2005/0201052 A1 * | 9/2005 | Chen et al. | 361/685 |

* cited by examiner

*Primary Examiner*—Jayprakash N Gandhi
*Assistant Examiner*—Nidhi Desai
(74) *Attorney, Agent, or Firm*—Wei Te Chung

(57) ABSTRACT

A computer enclosure includes a chassis (10) and a bracket (20) secured in the chassis. The bracket includes a bottom wall (201) and two parallel first side walls (203, 204) bent from opposite edges of the bottom wall in a first direction for securing a first disk drive therebetween. The bottom wall defines an opening (202) for a second disk drive (40) inserting therethrough. Two parallel second side walls (206, 207) are bent from opposite edges of the opening in a second direction for securing a second disk drive therebetween. The second direction opposes to the first direction.

18 Claims, 4 Drawing Sheets

COMPUTER ENCLOSURE UTILIZING A MOUNTING APPARATUS

BACKGROUND

1. Technical Field

The present invention relates to mounting apparatuses, and more particularly to a mounting apparatus for a disk drive of a computer or a server.

2. General Background

A disk drive, such as an HDD (hard disk drive), a CD-ROM (compact disc read-only memory) drive, is usually provided in a computer. A bracket is formed on a front plate of a computer enclosure. Usually, the HDD and the CD-ROM are separately installed in the bracket after a motherboard is installed in the computer enclosure, and large space is needed in the computer enclosure. However, in some thin computer enclosures, the space is so limited that the HDD cannot be installed in the bracket after a motherboard is installed.

What is needed, therefore, is a computer enclosure having a bracket allowing easy installation of an HDD therein either in a conventional computer or in a thin computer.

SUMMARY

A computer enclosure includes a chassis and a bracket secured in the chassis. The bracket includes a bottom wall and two parallel first side walls bent from opposite edges of the bottom wall in a first direction for securing a first disk drive therebetween. The bottom wall defines an opening for a second disk drive inserting therethrough. Two parallel second side walls are bent from opposite edges of the opening in a second direction for securing a second disk drive therebetween. The second direction opposes to the first direction.

Other advantages and novel features will be drawn from the following detailed description of preferred embodiments with attached drawings, in which:

DETAILED DESCRIPTION OF PREFERRED EMBODIMENTS

Figure 1:
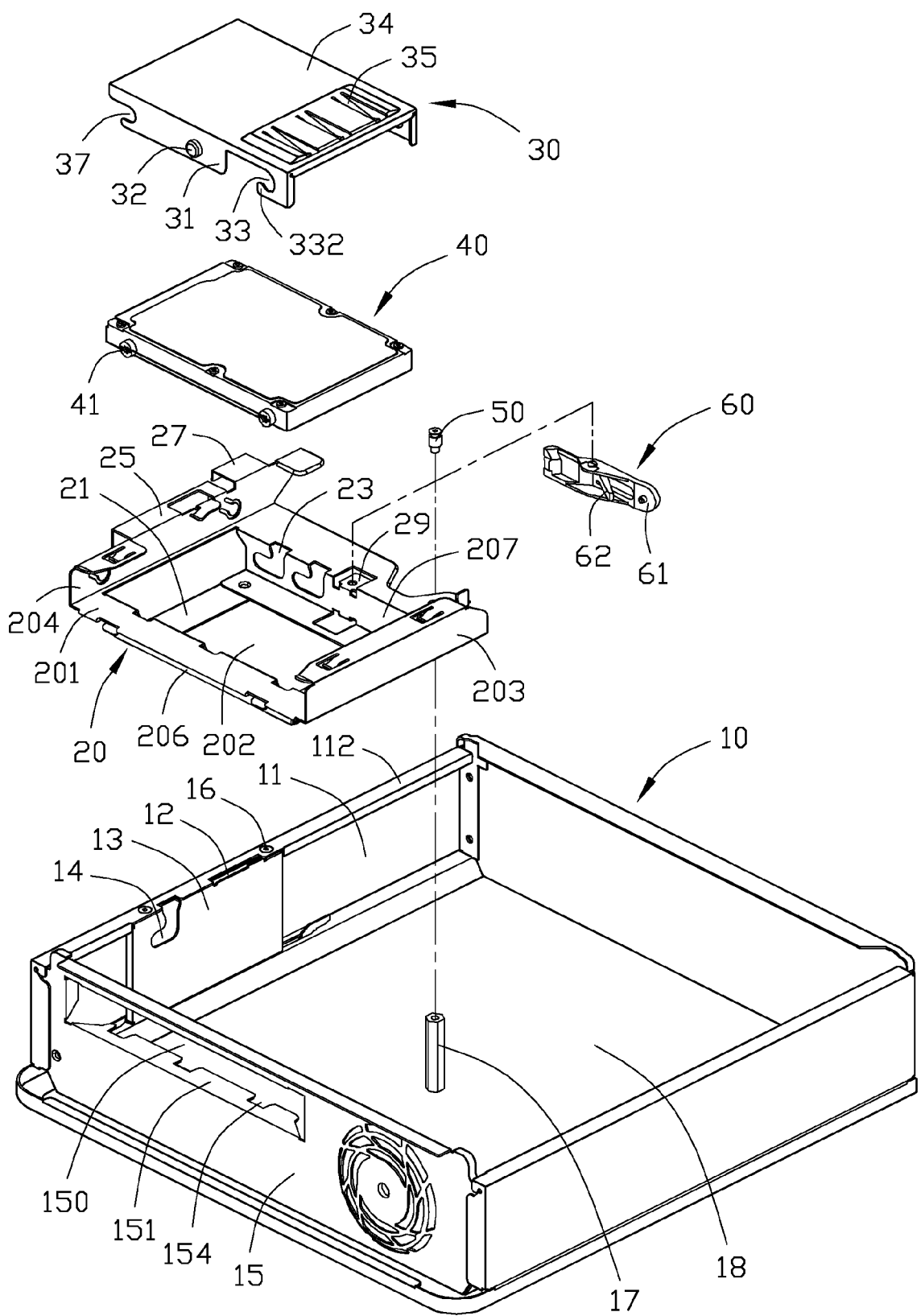
FIG. 1 is an exploded, isometric view of a computer enclosure and a disk drive of a preferred embodiment of the present invention, the computer enclosure including a chassis, a bracket, a tray, and a locking member.

Referring to FIG. 1, a computer enclosure of a preferred embodiment of the present invention includes a chassis 10, a bracket 20, a tray 30, and a locking member 60.

The chassis 10 includes a bottom plate 18, a front plate 15, and a side plate 11. The front plate 15 and the side plate 11 are perpendicular to each other, and respectively perpendicular to the bottom plate 18. A pole 17 with a mounting hole defined therein is disposed on an inner surface of the bottom plate 17. A rectangular opening 150 is defined in the front plate 15. A support piece 151 is perpendicularly bent in from a bottom edge of the opening 150. Three cutouts 154 are defined in the support piece 151. A bent flange 112 is perpendicularly bent in from a top edge of the side plate 11. A securing piece 13 is fixed on an inner surface of the side plate 11 below the bent flange 112 with screws 16. An L-shaped latch slot 14 and a locking slot 12 are defined in the bent flange 112 of the side plate 111 and the securing piece 13. The latch slot 14 includes a horizontal portion generally parallel to the top edge of the side plate 14, and a vertical portion generally perpendicular to the top edge of the side plate 14.

Figure 2:
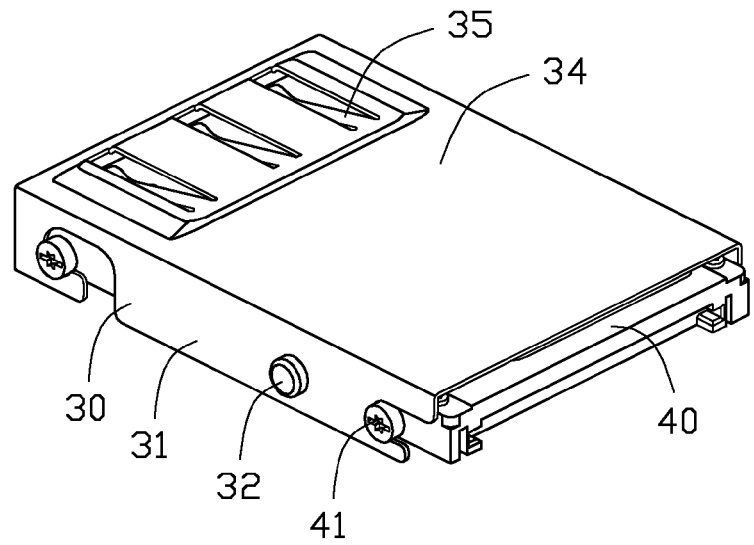
FIG. 2 is an isometric view of the bracket, the locking member, and assembly of the tray and the disk drive.
Figure 2:
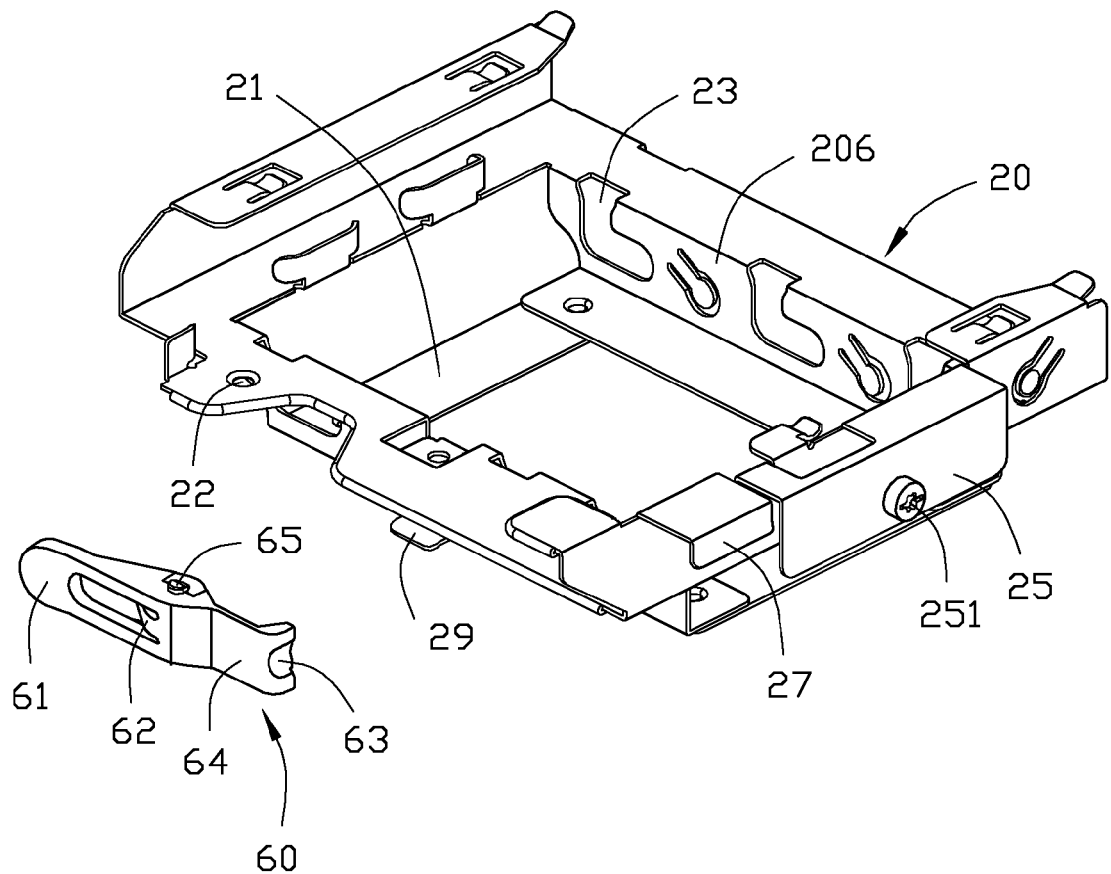

Referring also to FIGS. 1 and 2, the bracket 20 includes a bottom wall 201, and two parallel first side walls 203, 204 extending up from opposite edges of the bottom wall 201 for securing a first disk drive (not shown) therebetween, such as a CD-ROM drive. An L-shaped first bent piece 25 and an L-shaped second bent piece 27 extend outward from a top edge of the first side wall 204. Each of the first and second bent pieces 25, 27 includes a horizontal portion perpendicular to the first side wall 204, and a vertical portion parallel to the first side wall 204. A post 251, which may be a screw, is fixed on the vertical portion of the first bent piece 25 of the first side wall 204, corresponding to the latch slot 14 of the side plate 11 of the chassis 10. The vertical portion of the second bent piece 27 can be inserted into the locking slot 12 of the side plate 11 and slide in the locking slot 12 along a direction parallel to the top edge of the side plate 11, so that the post 251 of the first bent piece 25 can be slid from the vertical portion to the horizontal portion of the latch slot 14. A rectangular opening 202, and a mounting hole 22 corresponding to the pole 17 of the chassis 10 are defined in the bottom wall 201. Two parallel second side walls 206, 207 are bent down from opposite edges of the opening 202. The second side walls 206, 207 are perpendicular to the first side walls 203, 204. A bottom flange (not labeled) is perpendicularly bent in from the bottom of each of the second side walls 206, 207. The bottom flanges of the second side walls 206, 207 are connected with two connecting pieces 21. Three L-shaped latch slots 23 are respectively defined in each of the second side walls 206, 207. Each latch slot 23 includes a horizontal portion generally parallel to top edges of the second side walls 206, 207, and a vertical portion generally perpendicular to the top edges of the second side walls 206, 207. A pair of up and low mounting pieces 29, each with a pivot hole (not labeled) defined therein, are formed on and perpendicular to the second side wall 207.

Referring to FIGS. 1 and 2, the tray 30 includes a top wall 34, and a pair of parallel side walls 31 perpendicularly bent down from opposite edges of the top wall 34. A plurality of resilient slanted finger pieces 35 is formed down on the top wall 34 by stamping. A generally L-shaped securing slot 33, and a cutout 37 are defined in each of the side walls 31. The securing slot 33 includes a horizontal portion generally parallel to a top edge of the side wall 31, and a vertical portion generally perpendicular to the top edge of the side wall 31. The cutout 37 extends in a direction parallel to the top edge of each side wall 31. A positioning portion 332 is formed on an end of a bottom edge of the horizontal portion of the securing slot 33. A post 32, which may be a screw, is fixed on each of the side walls 31 between the securing slot 33 and the cutout 37.

The locking member 60 is includes an operating portion 61 and a positioning portion 64. A pair of pivot shafts 65 is disposed on opposite sides of the locking member 60 between the operating portion 61 and the positioning portion 64. A resilient finger tab 62 extends aslant from the operating portion 61 for retaining the locking member 60 in an original position. A positioning slot 63 is defined in an outer end of the positioning portion 64.

Referring to FIGS. 1 and 2, a second disk drive 40, such as an HDD, with two posts 41 disposed respectively on opposite side walls is secured on the tray 40 between the side walls 31. The posts 41 are respectively positioned in the cutout 37 and the securing slot 33, and blocked by the positioning portions 332 from sliding in the horizontal portions of the securing slots 33. The finger pieces 35 are compressed by the top surface of the disk drive 40 and resiliently deformed to thereby urge the posts 41 to tightly abut against the corresponding positioning portions 332. When it is desired to detach the disk drive 40 from the tray 30, the disk drive 40 is pushed towards the top wall 34 of the tray 30 to resiliently deform the finger pieces 35. The posts 41 of the disk drive 40 are thereby disengaged from the positioning portions 332 of the securing slots 33, and can be thus slid out of the horizontal portions of the securing slots 33. Thus, the disk drive 40 can be taken away from the tray 30.

Figure 3:
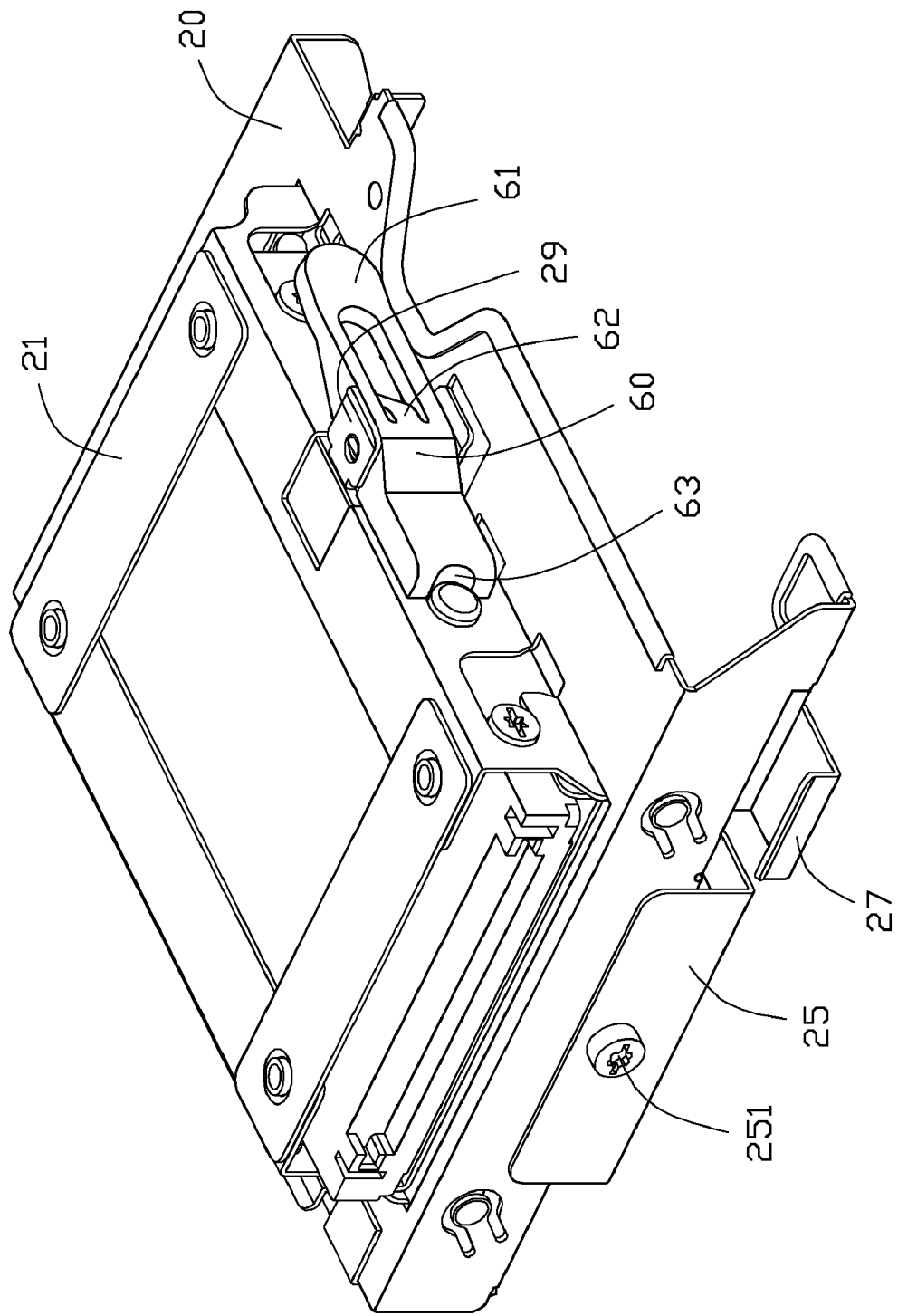
FIG. 3 is an assembled view of FIG. 2, but viewed from another aspect.

Referring to FIG. 3, the locking member 60 is pivotably secured between the mounting pieces 29 of the second side wall 207 with the pivot shafts 65 inserting into the corresponding pivot holes of the mounting pieces 29. The positioning portion 64 of the locking member 60 abuts on an outer surface of the second side wall 207, and the finger tab 62 is in an original state.

Referring to FIG. 3, the disk drive 40 together with the tray 30 is inserted between the first side wall 206, 207 of the bracket 20 through the opening 202 of the bottom wall 201, along a vertical direction perpendicular to the bottom wall 201. The posts 32 of the tray 30 and the posts 41 of the disk drive 40 are respectively slid into the latch slots 23 of the second side walls 206, 207 of the bracket 20. The positioning slot 63 of the locking member 60 receives the post 32 of the tray 30, thereby the positioning portion 64 blocking the post 32 from sliding away from the horizontal portion of the corresponding latch slot 23. When it is desired to remove the disk drive 40, the operating portion 61 of the locking member 60 is pressed to pivot the positioning portion 64 away from the second side wall 207, thereby releasing the post 32 of the tray 30 to allow the post 32 to slide from the horizontal portion to the vertical portion of the corresponding latch slot 23 by pushing the disk drive 40. Thus, the disk drive 40 and the tray 30 can be detached from the bracket 20.

Figure 4:
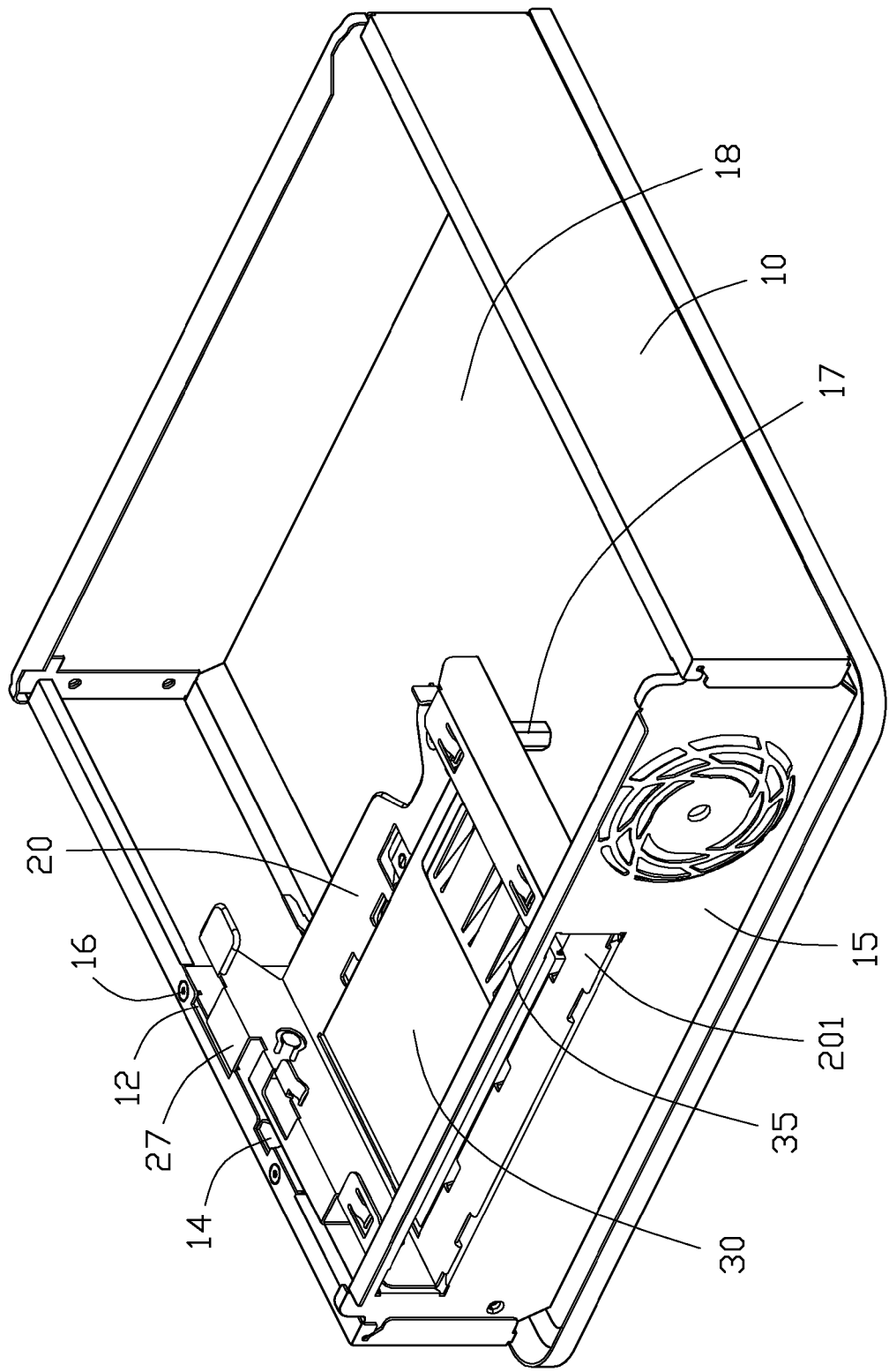
FIG. 4 is an assembled view of FIG. 1.

Referring also to FIG. 4, the bracket 20 is fixed on the chassis 10. The post 251 of the first bent piece 25 of the bracket 20 is inserted into the horizontal portion from the vertical portion of the latch slot 14. The vertical portion of the second bent piece 27 is inserted into the locking slot 12. The bottom wall 201 of the bracket 20 is retained on the support piece 151 of the front plate 15 of the chassis 10. The cutouts 154 align with the vertical portions of the three corresponding latch slots 23 of the first side wall 206. The mounting hole 22 of the bracket 20 aligns with the mounting hole of the pole 17 of the bottom plate 18 of the chassis 10. A mounting member 50, such as a screw, is inserted into the mounting hole of the pole 17 via the mounting hole 22, thereby preventing the post 251 of the bracket 20 sliding out from the latch slot 14. The bracket 20 is thus stably secured in the chassis 10.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A computer enclosure comprising:
a chassis; and
a bracket secured in the chassis, the bracket comprising a bottom wall and two parallel first side walls bent from opposite edges of the bottom wall in a first direction for securing a first disk drive therebetween, the bottom wall defining an opening for a second disk drive inserting therethrough, two parallel second side walls being bent from opposite edges of the opening in a second direction for securing the second disk drive therebetween, the second direction opposing to the first direction, the first side walls of the bracket being perpendicular to the second side walls.

2. The computer enclosure as described in claim 1, wherein each of the second side walls of the bracket defines a slot for receiving a post disposed on the second disk drive.

3. The computer enclosure as described in claim 2, wherein the slot of the bracket comprises a horizontal portion extending along a direction parallel to the bottom wall of the bracket for positioning the post of the second disk drive therein, and a vertical portion extending along a direction perpendicular to the bottom wall of the bracket for the post of the second disk drive sliding thereinto.

4. The computer enclosure as described in claim 3, wherein a locking member is pivotably attached to one of the second side walls for blocking the post of the second disk drive from disengaging from the horizontal portion of the latch slot.

5. A mounting apparatus for a disk drive with a post disposed thereon, comprising: a bracket comprising a bottom wall and two parallel first side walls bent from opposite edges of the bottom wall in a first direction for securing a first disk drive there between, the bottom wall defining an opening for a second disk drive inserting therethrough, two parallel second side walls being bent from opposite edges of the opening in a second direction for securing the second disk drive therebetween, the second direction opposing to the first direction, first side walls of the bracket being perpendicular to the second side walls, the opening being configured to receive the second disk drive in a direction to position between the second side walls, the direction being perpendicular to the bottom wall, adjacent edges of the opening being positioned in the bottom wall; and a locking member pivotably attached to one of the second side walls of the bracket for engaging with the post of the second disk drive and blocking the post sliding out of the slot, a resilient finger tab being formed on the locking member and abutting against the second side wall of the bracket for maintaining the engagement between the post of the second disk drive and the locking member.

6. The mounting apparatus as described in claim 5, wherein the slot of the bracket comprises a horizontal portion extending along a direction parallel to the bottom wall of the bracket, and a vertical portion extending along a direction perpendicular to the bottom wall of the bracket.

7. The mounting apparatus as described in claim 5, wherein the locking member is pivotable about an axis perpendicular to the bottom wall of the bracket.

8. The mounting apparatus as described in claim 5, further comprising a tray which comprises a top wall and two parallel side walls perpendicularly bent from opposite edges of the top wall for securing the second disk drive therebetween, the top wall covering the second disk drive at the opening.

9. The mounting apparatus as described in claim 8, wherein one of the side walls of the tray defines a slot for securing the post of the second disk drive, the slot comprising a horizontal portion extending along a direction parallel to the top wall of the tray, and a vertical portion extending along a direction perpendicular to the top wall of the tray.

10. The mounting apparatus as described in claim 9, wherein a positioning portion is formed on an edge of the horizontal portion of the slot of the tray for blocking the post of the second disk drive sliding out therefrom.

11. The mounting apparatus as described in claim 10, wherein at least one slanted resilient finger piece is formed on the top wall of the tray for pressing the second disk drive to urge the post of the second disk drive to tightly engage with the positioning portion of the slot.

12. The mounting apparatus as described in claim 8, wherein the top wall of the tray is parallel to the bottom wall of the bracket.

13. The mounting apparatus as described in claim 5, wherein the opening is rectangular.

14. A computer enclosure comprising: a chassis comprising a bottom plate, a first side plate and a second side plate perpendicularly connected with each other, the first side plate defining an opening therethrough, the second side plate defining a mounting slot; a bracket attached to the first and second side plates, the bracket comprising a bottom wall parallel to the bottom plate, a pair of first side walls extending from the bottom wall in a first direction perpendicular to the bottom plate, a pair of second side wails extending from the bottom wall in a second direction opposing to the first direction, the second side walls being perpendicular to the first side wails, a first space being formed between the first side walls and communicating with the opening of the chassis for receiving a first disk drive via the opening, a second space being formed between the second side walls for receiving a second disk drive therebetween; and a tray positioned between the first and second disk drives; wherein the bottom wall of the bracket defines an opening to allow the first space communicating with the second space, and the tray covers the second disk drive at the opening.

15. The computer enclosure as claimed in claim 14, further comprising a locking member pivotably attached to the bracket, wherein the second disk drive is slidably attached to the second space and the locking member acts to lock the second disk drive in the second space.

16. The computer enclosure as claimed in claim 15, wherein each of the second side walls defines an L-shaped slot, a pair of posts is provided at opposite sides of the second disk drive for sliding into the slots respectively, and the locking member forms a resilient tab abutting against the bracket to urge one portion of the locking member to block one of the posts of the second disk drive in the corresponding slot.

17. The computer enclosure as claimed in claim 14, wherein the second side plate of the chassis defines an L-shaped slot and a locking slot spaced from the L-shaped slot, one of the first side walls of the bracket provides a post being capable of sliding into the L-shaped slot and a bent piece being capable of inserting into the locking slot.

18. The computer enclosure as claimed in claim 14, wherein a pole extends from the bottom plate of the chassis in a direction parallel to the first and second side plates, and one corner portion of the bracket away from the first and second side plates is supported on the pole.

\* \* \* \* \*